Nov. 7, 1933.        G. E. PENNOCK        1,934,207
WOODWORKING MACHINE
Filed Dec. 16, 1929        3 Sheets-Sheet 3
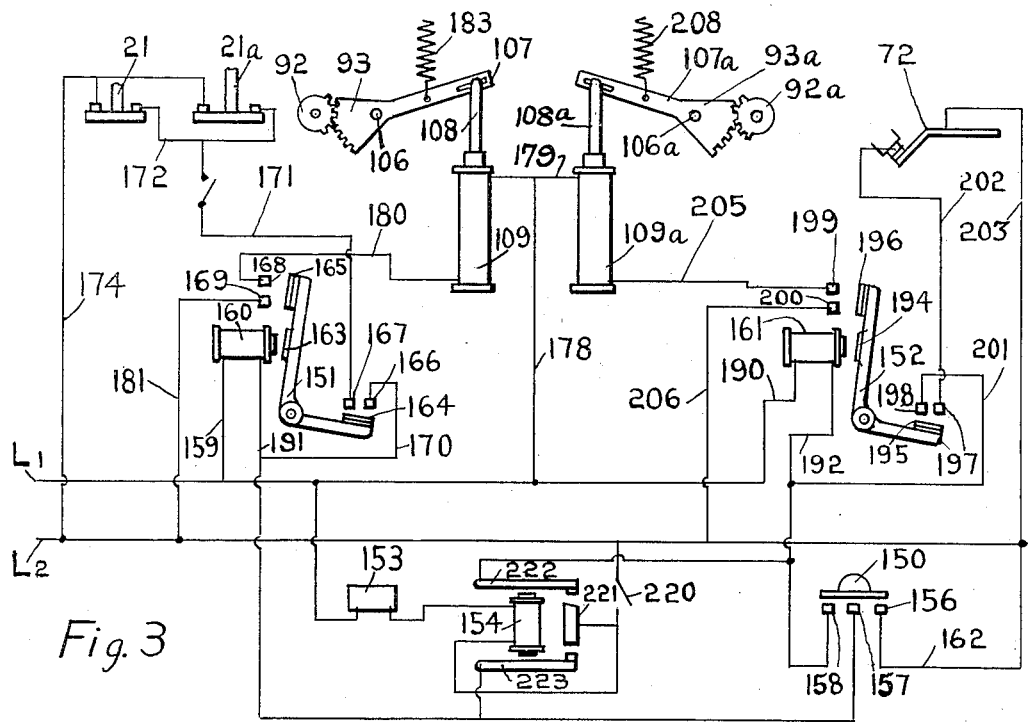
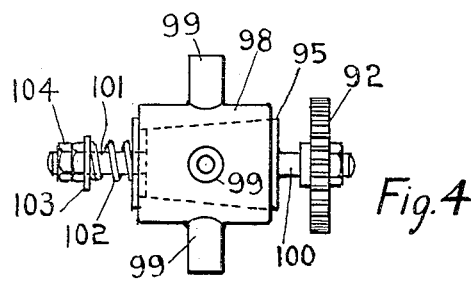
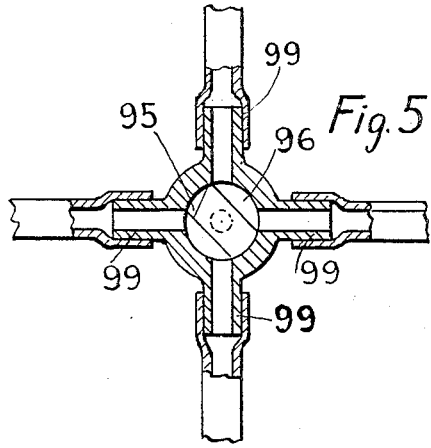
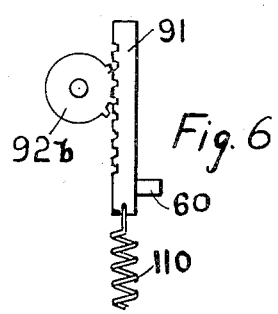
INVENTOR.
George E Pennock
BY Hull Brock + West
ATTORNEY.

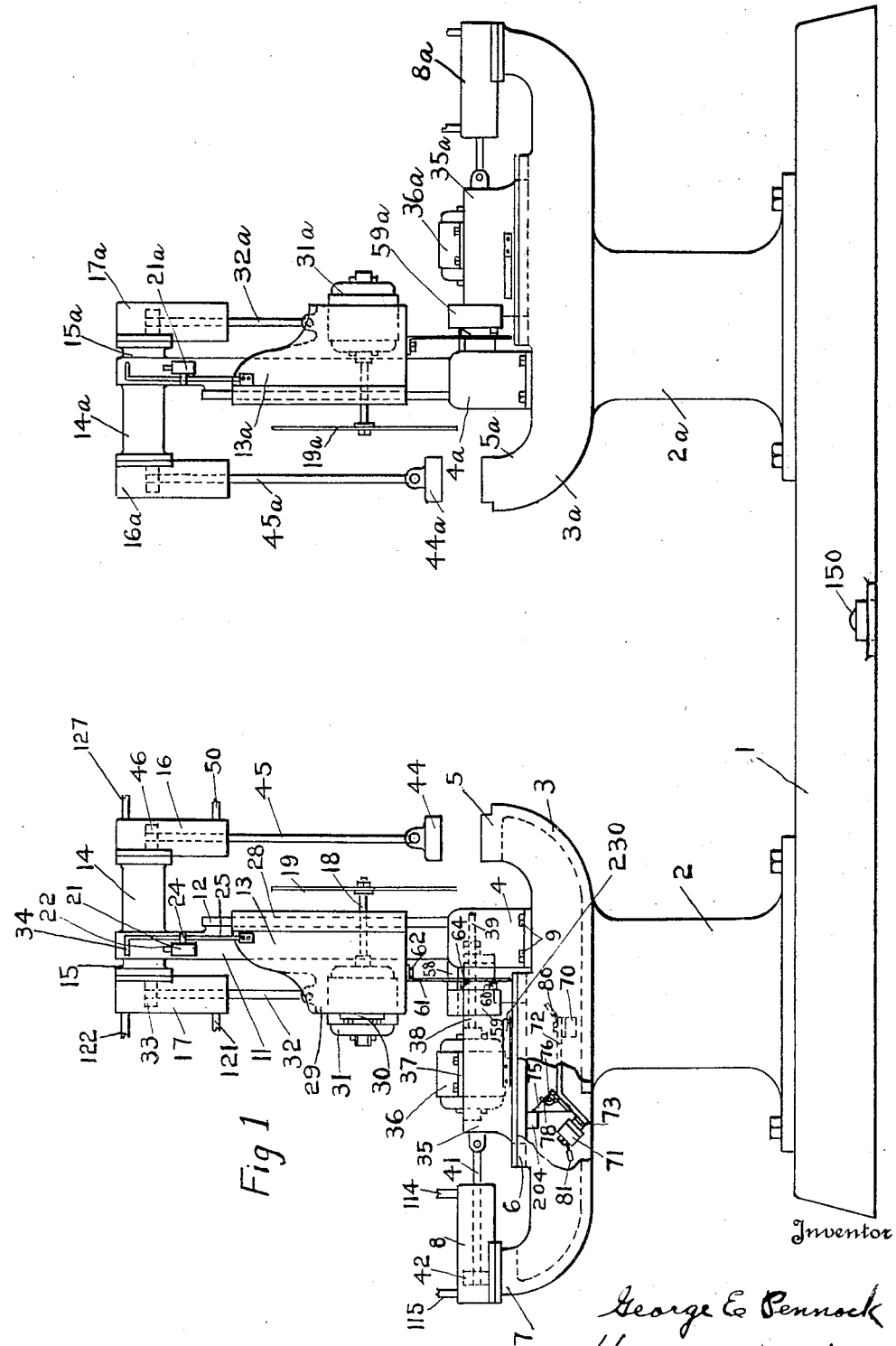

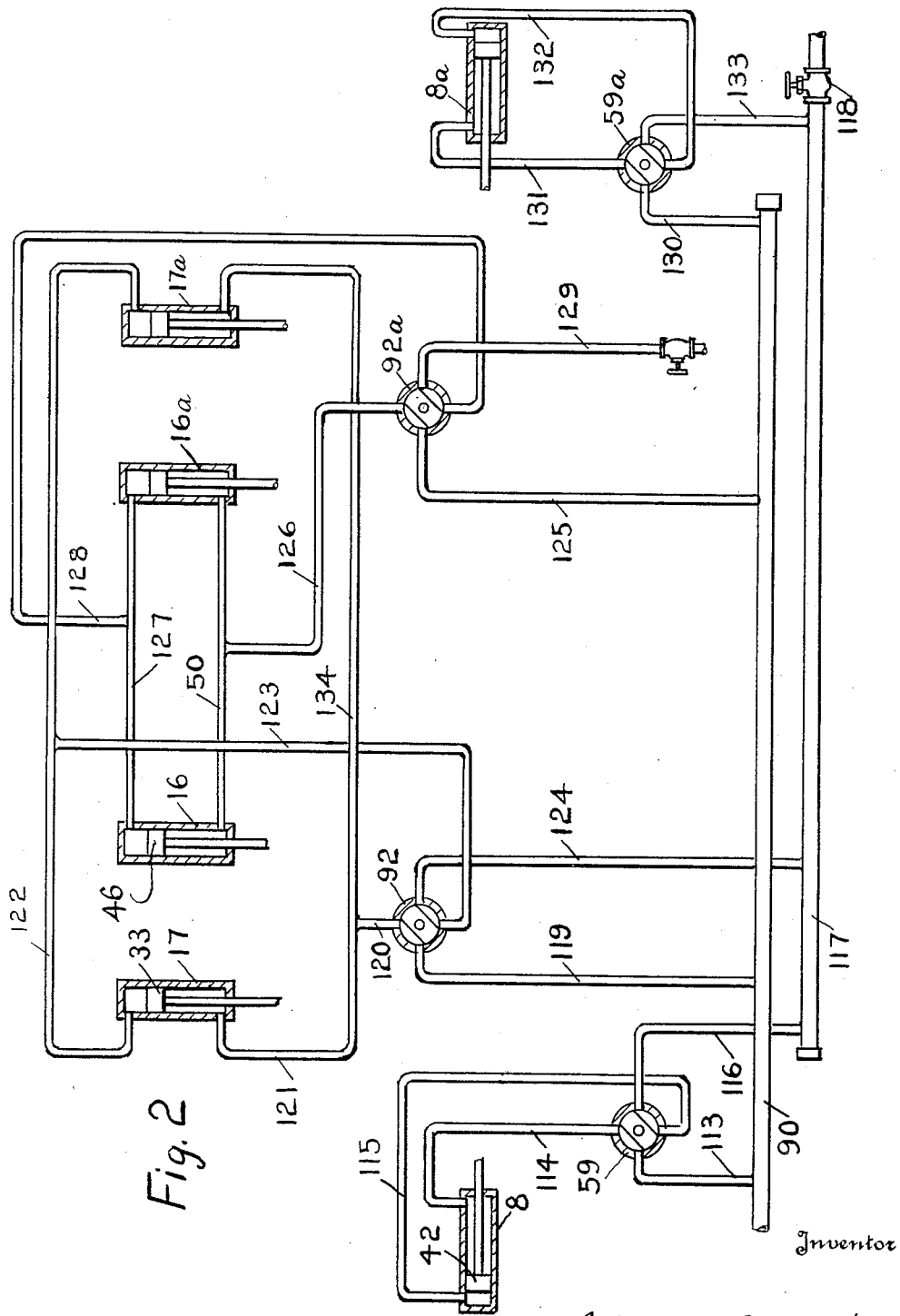

Patented Nov. 7, 1933

1,934,207

UNITED STATES PATENT OFFICE 1,934,207

WOODWORKING MACHINE

George E. Pennock, Bedford, Ohio

Application December 16, 1929
Serial No. 414,282

3 Claims. (Cl. 60—97)

This invention relates to a woodworking machine and more especially to one of the type which performs a sawing and drilling operation and is provided with means to clamp the wood while such operations are being performed. I am aware that machines of this type are well known and my invention consists principally in the means for controlling the functioning of the various parts of such machine and the combination of such controlling means with the machine itself.

One of the objects of my invention is to provide a machine which has means for clamping a piece of wood, for sawing off a portion thereof and performing a drilling operation thereon, all responsive to a momentary contact of a starting switch.

A further object of my invention is to provide means wherein such operations shall be performed in properly timed sequence and by the use of a comparatively simple controlling means.

A further object is to provide means whereby such operation shall be performed by a time-control mechanism without the use of a starting switch. Other objects will become apparent as the description proceeds.

I attain these and other objects by the mechanism disclosed in the following specification and in the accompanying drawings in which Fig. 1 is a diagrammatic view showing the principal mechanical features of my invention; Fig. 2 is a diagrammatic representation of the compressed air circuits which I employ in controlling the movement of certain parts of my machine; Fig. 3 is a wiring diagram showing the control circuits and a valve actuating mechanism operated thereby; Fig. 4 is a detail elevation of one of the valves; Fig. 5 is a section thereof; and Fig. 6 is a detail of an actuating means which I employ in controlling certain of the valves.

Describing the various parts of my machine and control therefor with reference to the accompanying drawings, the numeral 1 indicates a base upon which is supported two machines which are substantially identical in construction but related to each other as right and left hands. Since the two machines are substantially identical only one of them will be described. I provide on the base 1 a pedestal 2 associated with the base and which carries a casting 3 having an upright member 4 attached thereto. The said casting has at its forward end a clamp portion 5, near its middle portion a track 6 comprising guides which may receive the carriage, and at its rear portion a supporting means 7 for an air cylinder 8. The upright member 4 is attached to the casting 3 as by studs 9 and comprises a bifurcated lower portion, indicated specifically by the numeral 4, and an upright portion 11 which carries at its intermediate portion guides 12 for a saw carriage 13, and at its upper end is provided with brackets 14 and 15 for supporting air cylinders 16 and 17 respectively. The upright between the bifurcated portion 4 and the upper ends of the guides 12 is provided with a central slot through which may pass the shaft 18 which carries the saw 19. This slot is of sufficient length to provide for the vertical reciprocation of the shaft 18 through its normal stroke. The upright member 4 also carries near its upper end a switch 21 provided with a plunger 22 which is adapted to break a contact when depressed. A guide 24 may be attached also to said upright member for cooperation with the rod 25 carried by the saw carriage 13 for the purpose of cooperating with the plunger 22 when the saw carriage 13 reaches the lowermost position of its working structure.

The saw carriage 13 comprises a casting provided with guides 28 at its forward edge, adapted to cooperate with the guides 12 on the upright member 4, and having a rearward extension 29 to which is attached as by brackets 30 an electric motor 31, to the shaft 18 of which is attached the saw 19. Attached to the saw carriage is a rod 32 having at the upper end thereof a piston 33 cooperating with the air cylinder 17. The switch actuating rod 25 is also attached to the saw carriage and is provided at its upper end with a bent-over portion 34 adapted to contact with the plunger 22 of the switch 21.

A drill carriage 35 is provided which consists of a casting having guides at the lower edge thereof cooperating with the guide 6 of the casting 3, an electric motor 36 attached to the member 35 through the medium of a bracket 37 and having the shaft 38 thereof connected through any suitable mechanism with the drill 39. Attached to the drill carriage is a rod 41 which carries at the rear end thereof a piston 42 cooperating with the air cylinder 8.

The clamping means consists of the upper face 5 of the casting 3 and a clamp member 44 carried at one end of a rod 45 which is attached to the piston 46 cooperating with the air cylinder 16. The air cylinder 16 is provided with pipes 50 and 127 at the top and bottom thereof through which air under pressure is adapted to be admitted to elevate or press down the clamp member 44. The air cylinder 17 is similarly provided with pipes 121 and 122 for raising and lowering the saw carriage. The air cylinder 8 is provided with tubes 114 and 115 for controlling movement of the drill carriage 35.

Attached to the member 4 as by a bracket 58 is a valve 59, shown only in outline in Fig. 1 and partially in more detail in Fig. 6, having a vertically movable operating lug 60 which cooperates with a resilient member 61 attached to the saw carriage 13 as by studs 62 and carrying thereon a wedge shaped member 64. Attached to the casting 3 in any suitable manner are insulating blocks 70 and 71. The block 70 has attached thereto a resilient spring metal arm 72 carrying at one end a switch contact 73 which cooperates with a similar contact on the block 71. Mounted adjacent the resilient arm 72 in any suitable manner is a generally triangularly shaped member 75 rotatable about a pin 76 and having the corner thereof adjacent such pin surrounded in form so that a clockwise rotation from the position shown in Fig. 1 does not result in the separation of the contacts whereas the counterclockwise rotation from such position does result in separating the contacts. The member 75 is normally held in the position shown in Fig. 1 by a spring 78 wound about the pin 76. Suitable leads 80 and 81 are attached to the said contacts and cooperate with other parts of the machine in a manner to be described.

In order to actuate the pistons in the various air cylinders I employ the arrangement of air tubes shown in Fig. 2 wherein a pipe 90 is connected to any suitable compressed air supply and has leads proceeding therefrom to the various valves. The valves are all of the same construction varying only in that two of them are actuated by a rack 91 meshing with the pinion $92^b$ while the other two are operated by gear segments 93, $93^a$ meshing with such pinions. Corresponding parts of these valves are indicated by the same numerals but having a letter subscript to differentiate them from each other. Each valve consists of a rotor 95 having grooves 96 therein as indicated in Fig. 5 and a shell 98 provided with tubes 99 spaced 90° apart. The rotor 95 has grooves 96 adapted to connect adjacent tubes 99. This rotor also carries a reduced shaft portion 100 to which is attached in any suitable manner the pinion 92 and at the opposite end another reduced portion 101 which carries a spring 102 which bears against the shell 98 at one end and against a washer 103 at its other end, said washer being retained in place in any suitable manner as by a nut 104 threaded on said portion 101. The pinions 92, $92^a$ of two of said valves are actuated as shown in Fig. 3 by sectors 93, $93^a$ pivotally mounted as at 106, $106^a$ and connected by pin and slot connection through an arm 107, $107^a$ to the plungers 108, $108^a$ of solenoids 109, $109^a$. The operating mechanism of the other two valves, indicated in Fig. 1 at 59 comprises any suitable housing 59 in which the mechanism may be mounted, a valve such as shown in Fig. 4, and a rack 91 meshing with the pinion $92^b$ of such valve and carrying a lug 60 adapted to cooperate with the member 64, and being held in normal position by a spring 110 attached in any suitable manner to the bottom of said housing 59.

In Fig. 2 the valves are indicated in schematic cross section and referred to generally by reference numerals 59 and $59^a$ for the valves operating the drill carriages and 92 and $92^a$ for the valves operated by solenoids 109, $109^a$, the reference numerals 92, $92^a$ also indicating specifically the pinions on the respective valves. It will be seen that when the valves are in the position shown in Fig. 2 air will tend to flow through the tube 113, valve 59, and tube 114 to the front end of the air cylinder 8, thereby holding the drill carriage 35 by means of the piston 42 in inoperative position. At the same time air on the other side of the piston 42 will be permitted to discharge through the tube 115, valve 59, tube 116 to the exhaust pipe 117, which is provided with a valve 118 which may be varied to cause the air thus exhausted to escape at any desired speed. At the same time air will tend to flow from the main 90 through tube 119, valve 92, tube 120 and tube 121 to the lower end of the air cylinder 17 thus tending to lift the piston 33 to its uppermost position. Air contained in such air cylinder will be permitted to escape through tube 122, tube 123, valve 92 and tube 124 to the exhaust pipe 117. At the same time air will tend to flow from the main 90 through the tube 125, valve $92^a$, tube 126 to the bottoms of air cylinders 16, $16^a$. Air contained in said cylinders will be free to escape through tube 127, tube 128, valve $92^a$ and tube 129 to the exhaust pipe 117. At the same time air will tend to flow from the main 90 through tube 130, valve $59^a$ and tube 131 to the front of air cylinder $8^a$. Air contained in cylinder $8^a$ will be free to escape through tube 132, valve $59^a$ and tube 133 to the exhaust pipe 117. At the same time air will tend to flow from the main 90 through tube 119, valve 92 and tube 134 to the bottom of air cylinder $17^a$. Air contained in cylinder $17^a$ will then be free to escape through tube 122, tube 123, valve 92 and tube 124 to the exhaust pipe 117. It will be evident that when any one of these valves is rotated through 90° the effect will be to admit air to the other end of the air cylinder and cause the exhaust from said cylinder to flow through the same valve by the other groove to the exhaust pipe.

For controlling the valves and consequently moving the clamp and carriages I employ an electrical control system which I have shown diagrammatically in Fig. 3. This system includes in addition to the valve controlling mechanisms and switches 21, $21^a$ and 72 already described, a starting switch 150 and a pair of electrically controlled switches or relays indicated generally by the numerals 151 and 152, a time switch including any well known mechanism such as clockwork for making a circuit momentarily at predetermined intervals, indicated at 153, and a double relay indicated generally at 154 which in effect substitutes for starting switch 150. All these mechanisms are suitably connected to a source of electric power and these connections will now be described. When the starting switch 150 is depressed the three contacts 156, 157 and 158 will be electrically connected. Current will then flow from line L' through conductor 159 through the winding 160 of the relay switch 151, through the conductor 191 to the contact point 157, across to the contact point 156, through conductor 162 to the line $L^2$. This will attract the armature 163 of the relay 151 and cause contacts 164 and 165 to connect contacts 166 and 167 and contacts 168 and 169 respectively. Current will then flow from the line L' through conductor 159, through the winding of relay 151, through conductor 191, conductor 170 from contact 166 to contact 167, through conductor 171, conductor 172, through switches 21, $21^a$ which are connected in parallel as shown, through conductor 174 to line $L^2$, thereby making a circuit through the winding 160 which is independent of the starting switch 150 and dependent on one of switches 21, $21^a$ being closed. The armature 163 of the relay will consequently be held closed until both switch 21 and $21^a$ have been opened by the saw carriages reaching the bottom of their downward strokes. When the relay is closed a circuit will be made through the line L', conductor 178, conductor 179, solenoid 109, conductor 180, contact 165, conductor 181 to the line $L^2$. This will energize the solenoid 109 causing the plunger 108 thereof to operate against the force of spring 183 to rotate the pinion 92 through 90°. This will change the position of valve 92 and cause air to be fed to the tops of cylinders 17 and 17ª thereby intiating the downward stroke of the saw carriage 13. When the saw carriages both reach the bottom of their downward stroke both switches 21 and 21ª will be opened and this will break the circuit through the winding 160, allow the armature 163 of the relay 151 to swing to open position and thereby cause deenergization of the solenoid 109 and permitting the spring 183 to move the pinion 92 to its original position thereby reversing the direction of movement of the saw carriages.

When the starting switch 150 is depressed a circuit will be made from L' through conductor 190 through the winding 161 of the relay 152 through the conductor 192 across the starting switch and through conductor 162 to the line L². This will cause the armature 194 to be attracted and will cause contacts 195 and 196 to be moved across contacts 197 and 198 and contacts 199 and 200. A circuit will now be made from the line L' through conductor 190, winding 161, conductor 192, conductor 201, contact 195, conductor 202, switch 72 and conductor 203 to the line L². A circuit will thus be made through the coil of the relay 152 independent of the starting switch 150 and dependent upon the switch 72 which will be opened by reason of lug 204 on the drill carriage rotating member 75 counterclockwise to open switch 72. When the relay 152 is attracted a circuit will also be made from line L' through conductor 178 through the solenoid 109ª through conductor 205 across the contact 196 through conductor 206 to the line L². This will cause plunger 108ª and the solenoid 109ª to operate to rotate valve pinion 92ª against the pull of spring 208. This will operate to cause air to flow to the top of air cylinders 16, 16ª and cause the clamping members 44, 44ª to move downwardly to clamp the work between jaws 5 and 44. The clamp will remain in this position until the circuit through the winding 161 is broken by the opening of switch 72 caused by the return of the drill carriage 35 to retracted position.

I have shown a time controlling mechanism adapted to render this machine entirely automatic and which is adapted to be substituted for the starting switch 150 by the closing of switch 220. This mechanism comprises any suitable time controlled means for making a momentary contact at predetermined intervals and which is indicated at 153, a winding 154, a contact 221 and armatures 222 and 223 which are adapted to connect with contact 221 when coil 154 is energized. When these contacts are brought together it will be seen that they serve to make the same connections as would be made if switch 150 were closed, since armature 223 is connected to contact 157, armature 222 is connected to contact 158 and contact 221 is connected through switch 220 to line L² to which contact 156 is also connected. I contemplate the operation of my device in a semi-automatic manner by the use of switch 150 or in an entirely automatic manner by the use of the time controlling mechanism which can be substituted for starting switch 150 merely by closing switch 220.

The general operation of my improved machine will now be described. Assuming the parts are in the position shown in Fig. 1, air will be pressing pistons 33 and 46 upwardly and piston 42 rearwardly. The work will be placed in position on the jaw 5 and the starting switch 150 will be depressed. The result will be that valves 92 and 92ª will be rotated through 90° which will result in admission of air to the top of air cylinders 16 and 17 thus causing the clamping member 44 to snap downwardly into contact with the work and the saw carriage to move downwardly to operative position, but being held against too rapid downward movement by the constricting exhaust valve 118. As soon as the saw carriages reach their lowermost position switches 21 and 21ª will be opened and the solenoid 109 will be deenergized thus allowing the valve 92 to be shifted to return the saw carriages to their upward position. At the lowermost portion of the stroke of the saw carriage the member 64 on the resilient arm 61 will hook underneath the lug 60 of the valve 59 whereby when the saw carriage has returned to its uppermost position the valve 59 will have been rotated a sufficient amount to admit air to the rear of the air cylinder 8 which will result in a forward movement of the drill carriage. When the drill carriage reaches its forwardmost position an arm 230 carried thereon will engage the lower end of the resilient arm 61 to release the lug 60 and allow the spring 110 to return the valve 59 to its original position which will result in admitting air to the forward end of the air cylinder 8 and returning the drill carriage to its rearmost position. Just as the drill carriage reaches the end of its rearward stroke the lug 204 carried thereby will cooperate with the member 75 to open the switch 72. This will break the circuit through the winding 161, allow the armature 152 to swing to open position, break the circuit through solenoid 109ª and allow the valve 92ª to be rotated through 90° which rotation will cause air to be admitted to the lower end of the air cylinder 16 which will result in releasing the clamp 44.

Having thus described my invention, what I claim is:

1. In a woodworking machine, a pair of valves, a pair of solenoids, means whereby said solenoids control said valves, and means for controlling said solenoids including a starting switch, a relay switch and a stopping switch, a circuit for the coil winding of said relay, said starting switch being adapted to close said circuit, a second circuit for said coil winding through said stopping switch and said relay switch in series.

2. In a woodworking machine, an electrical control therefor including a starting switch, a pair of solenoids, means whereby said solenoids are energized by said starting switch, a stopping switch associated with each solenoid and means whereby operation of each of said stopping switches deenergizes its corresponding solenoid, one of said stopping switches comprising two switches connected in parallel whereby the circuit is complete until both are opened.

3. In a woodworking machine, a pair of valves, electrically energized means controlling said valves, and means for controlling said first means including a starting switch, a relay switch and a stopping switch, a circuit for the coil of said relay, said starting switch being adapted to close said circuit, and a second circuit for said relay coil through the same, said stopping switch and said relay switch in series.

GEORGE E. PENNOCK.